Feb. 26, 1924. 1,485,231
W. P. LEFTWICH ET AL
GEAR SHIFTING MECHANISM
Filed March 8, 1923     3 Sheets-Sheet 1
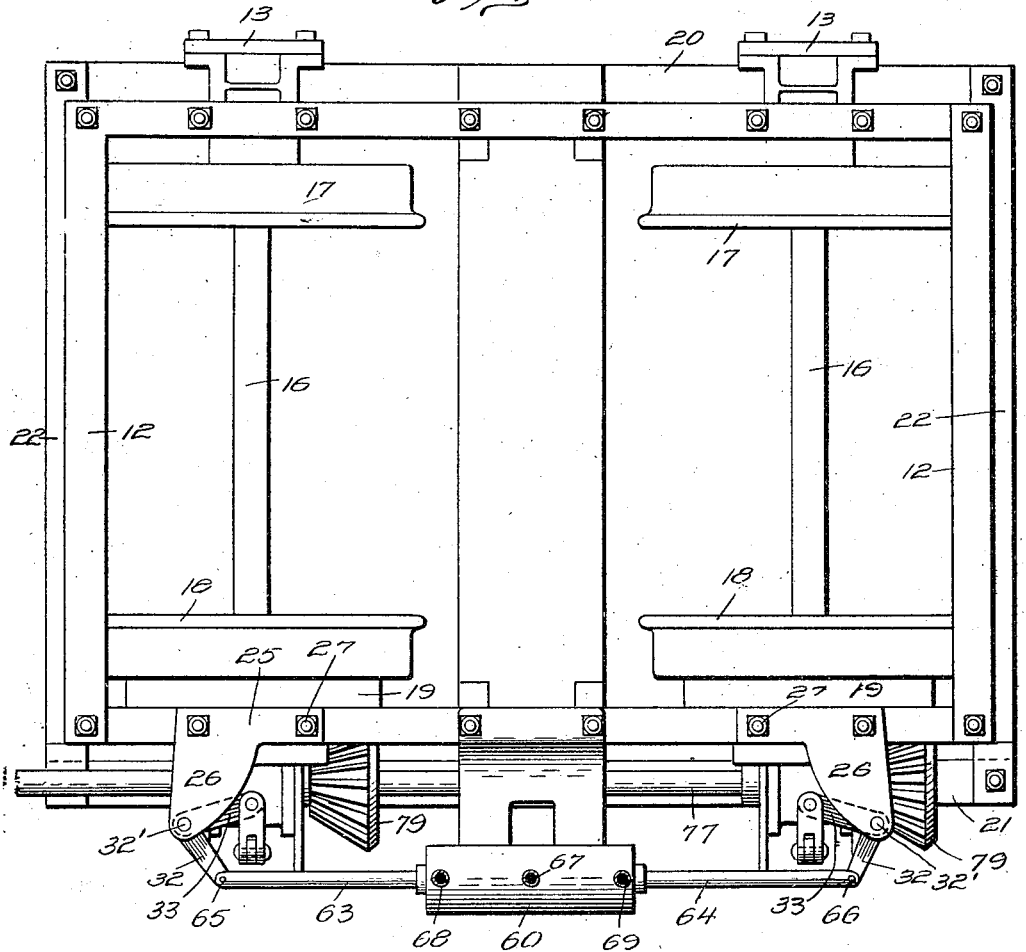
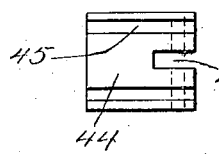
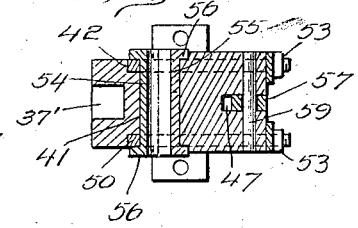
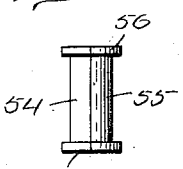
INVENTOR.
W. P. Leftwich.
Dira S. Stout.
BY
Geo. P. Kimmel
ATTORNEY.

Feb. 26, 1924.

W. P. LEFTWICH ET AL 1,485,231

GEAR SHIFTING MECHANISM

Filed March 8, 1923

INVENTOR.
W. P. Leftwich.
Dira S. Stout.
BY
Geo. P. Kimmel
ATTORNEY.

Feb. 26, 1924. 1,485,231
W. P. LEFTWICH ET AL
GEAR SHIFTING MECHANISM
Filed March 8, 1923   3 Sheets-Sheet 3
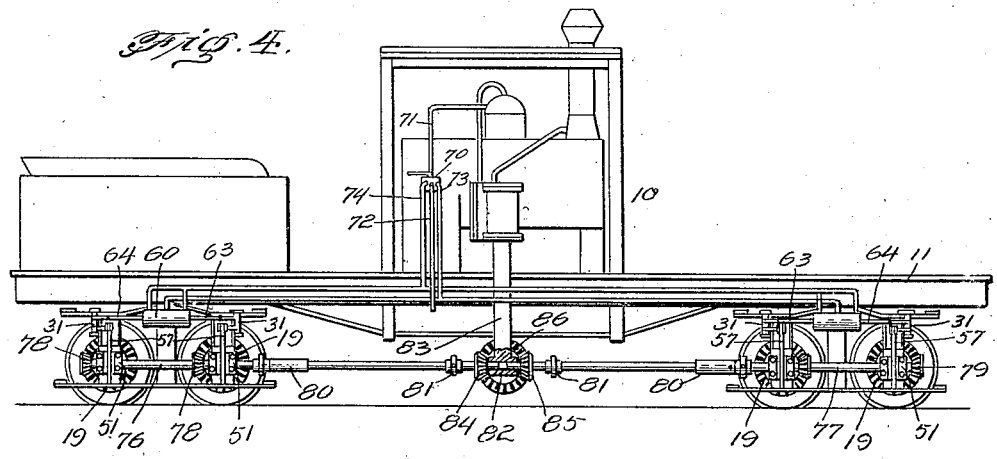
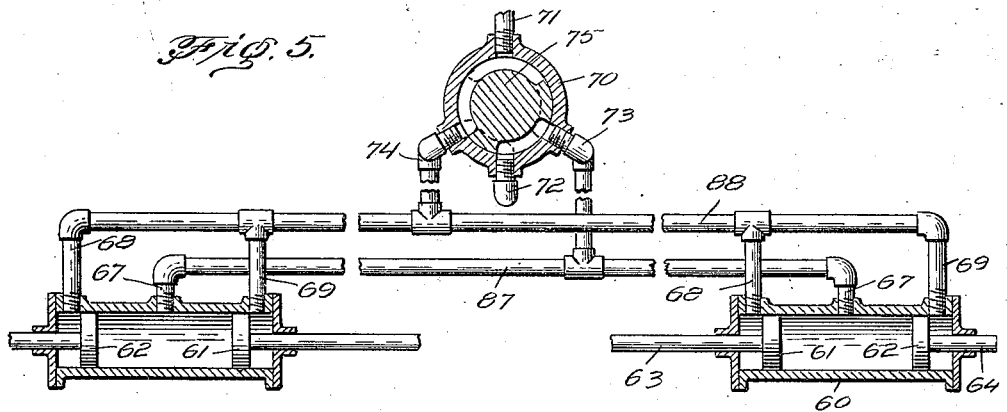
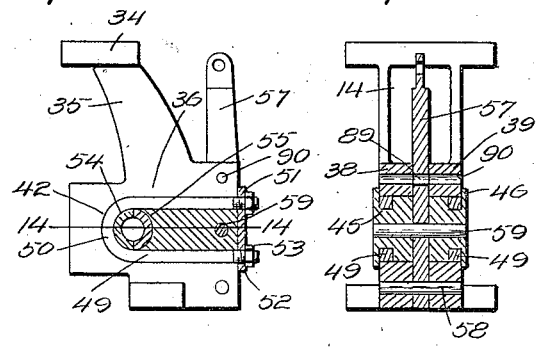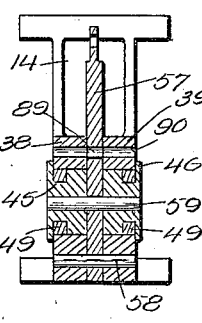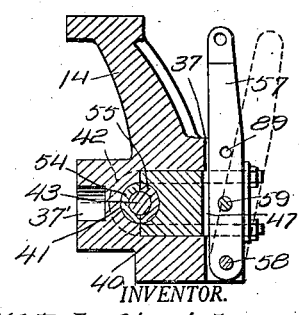
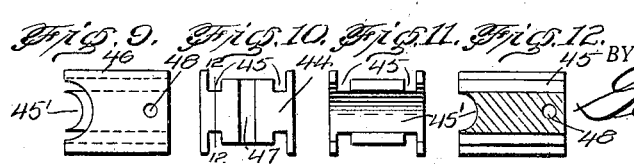
INVENTOR.
W. P. Leftwich
Dira S. Stout,
BY
Geo. P. Kimmel
ATTORNEY.

Patented Feb. 26, 1924.

1,485,231

UNITED STATES PATENT OFFICE.

WILLIAM P. LEFTWICH AND DIRA S. STOUT, OF NALLEN, WEST VIRGINIA.

GEAR-SHIFTING MECHANISM.

Application filed March 8, 1923. Serial No. 623,701.

*To all whom it may concern:*

Be it known that we, WILLIAM P. LEFTWICH and DIRA S. STOUT, citizens of the United States, residing at Nallen, in the county of Fayette and State of West Virginia, have invented certain new and useful Improvements in Gear-Shifting Mechanism, of which the following is a specification.

This invention relates to a gear shifting mechanism, designed primarily for use in connection with engines of the "Shay" type, but it is to be understood however, that a gear shifting mechanism in accordance with this invention can be employed for any purposes wherein it is found applicable, and the invention has for its object to provide in a manner as hereinafter set forth, a gear shifting mechanism including means whereby the line shafts carrying driving pinions cooperating with the crown gears secured to or forming part of the truck wheels can be shifted outwardly whereby the driving pinions will be moved out of mesh with the crown gears during the operation of the driving mechanism for the line shafts, so that the propelling of the trucks from such driving mechanism will be discontinued.

A further object of the invention is to provide in a manner as hereinafter set forth, a gear shifting mechanism including a fluid pressure operated means for moving the propelling elements of the engine out of operative relation with respect to each other without discontinuing the operation of the transmission means driven from the engine for operating the propelling elements.

A further object of the invention is to provide in a manner as hereinafter referred to, and for the purpose set forth, a gear shifting mechanism including a fluid pressure operated means for moving the propelling elements of the engine into and out of operative relation when occasion so requires.

Further objects of the invention are to provide a gear shifting mechanism for the purpose set forth, which is comparatively simple in its construction and arrangement, strong, durable, efficient in its use, conveniently operated, readily installed, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of one of the trucks of a Shay engine, showing the adaptation therewith of a gear shifting mechanism in accordance with the invention.

Figure 4 is a side elevation of a Shay engine including a pair of trucks and showing the adaptation with the trucks of a gear shifting mechanism for the line shafts in accordance with this invention.

Figure 5 is a sectional elevation of the fluid pressure operated controlling means for the shifting elements of the line shafts.

Figures 6, 7 and 8 are respectively sectional views taken at right angles to each other, illustrating an axle hanger provided with a shiftable carrier for a line shaft.

Figures 9, 10, 11, 12 and 13 are detail views of the body portion of the carrier which is in the form of a block.

Figure 14 is a section on line 14—14, Figure 6.

Figure 15 is a detail view of one of the bearing sleeves for a line shaft.

Figure 2:
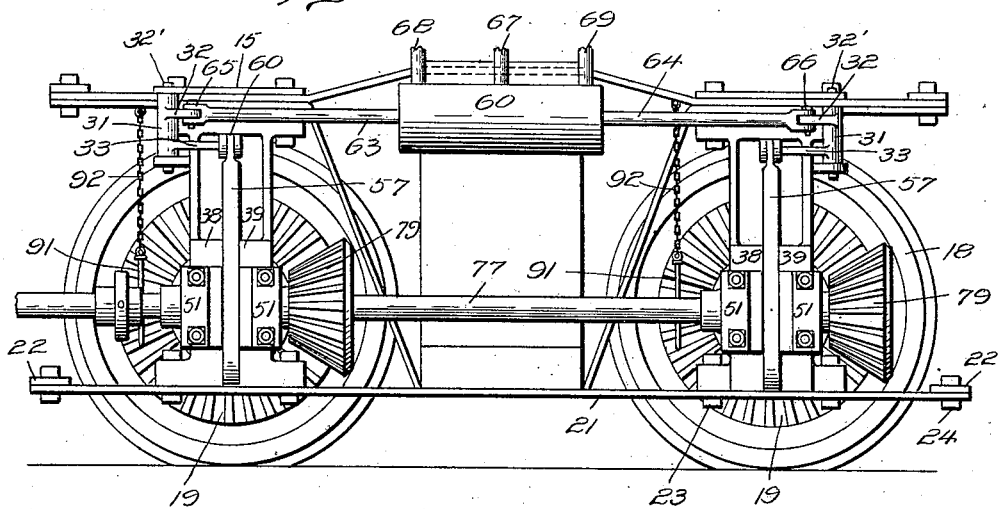
Figure 2 is a side elevation of the truck, showing the adaptation therewith of a gear shifting mechanism in accordance with this invention.
Figure 3:
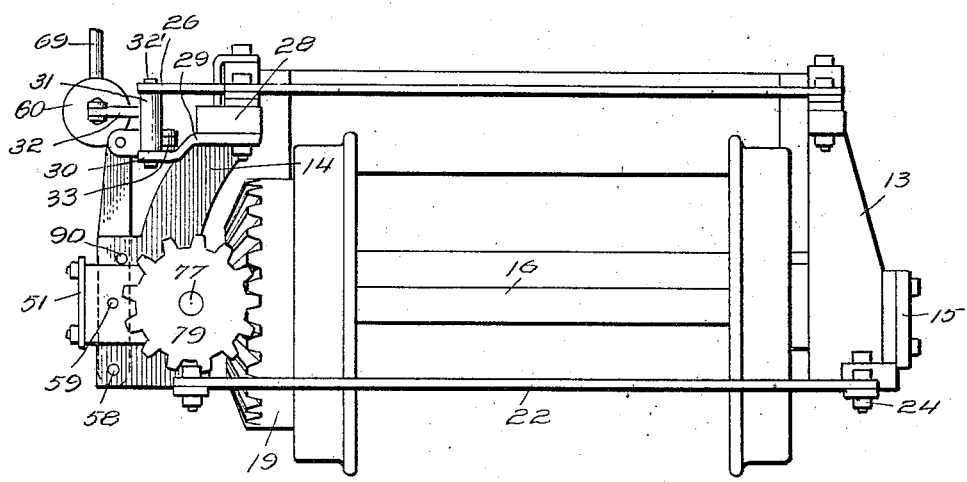
Figure 3 is an end view of the truck with the gear shifting mechanism applied thereto.

Referring to the drawings in detail, the reference character 10 indicates generally an engine of the Shay type and which includes a platform 11, mounted on a pair of trucks and each of the latter consists of a body portion 12, a pair of axle hangers 13, and a pair of axle hangers 14. The axle hangers 13 oppose the axle hangers 14, and said hangers 13 are provided with boxes 15, into which extend the axles 16. Each axle 16 extends from a hanger 13 to a hanger 14, and each axle 16 is provided with a pair of wheels, as indicated at 17, 18. The outer face of each of the wheels 18 has formed integral therewith or secured thereto in any suitable manner, a crown gear 19. The axle hangers 13 are connected together by a longitudinally extending member 20, and the axle hangers 14 are connected together by a longitudinally extending member 21. The members 20, 21, are connected together at their ends by transversely extending members 22. The hangers 13, 14 are mounted upon and connected to the members 20 and 21. The connecting devices between the members 20 and 21, and the hangers 13 and 14 are indicated at 23, and the connecting elements between the members 22 and the members 20 and 21 are indicated at 24. The members 20 and 21 project rearwardly and forwardly from the hangers 13 and 14. The hangers 13 are spaced from each other, and the hangers 14 are also spaced from each other. The hangers 13 may be of any suitable construction, but the manner of setting up the hangers 14 will be hereinafter referred to.

Projecting outwardly from the body portion 12, of the truck, near each end thereof, is a plate 25, having an extension 26. The plates 25 are oppositely disposed with respect to each other and are secured to the body portion 12 by the hold-fast devices 27. Connected with the body portion 12, directly below each extension 26, through the medium of the combined connecting and supporting elements 28, is a supporting arm 29, having its outer portion offset as at 30. Interposed between an extension 26 and the offset portion 30 of the arm 29, is a vertically disposed shiftable sleeve 31, connected with the extension 26 and offset portion 30 by a pivot bolt 32'. The sleeve 31 has formed integral therewith, between its center and its upper end, a crank arm 32, and said sleeve 31, has formed integral therewith, between the crank arm 32 and its lower end, a crank arm 33, which is of greater length than the crank arm 32. The crank arms 32 of one sleeve 31 are oppositely disposed with respect to the crank arms 32 of the other sleeve 31. The function of the crank arms 32, 33, will be hereinafter referred to.

Each of the hangers 14, best shown in Figures 6 to 8, consists of a head piece 34, provided with a pair of spaced depending arms 35, which terminate in a body portion 36, which projects inwardly and outwardly with respect to the lower termini of the arms 35. The inner end of the body portion 36 is provided with a socket 37', which constitutes a bearing for one end of an axle 16, and the outer end of the body portion 36 is bifurcated, as at 37, and the furcations formed thereby are indicated at 38, 39. The body portion 36 is furthermore provided with a pocket 40, disposed at rightangles with respect to the bifurcated portion 37, as well as being intersected by said bifurcated portion 37. The pocket 40 is arranged in alignment with the socket 37', and the latter is disposed concentrically with respect to the pocket. The inner wall of the pocket 40 is provided with a semi-circular seat 41, and with a pair of curved grooves 42. A groove 42 is positioned at each end of the seat 41 and formed in the side faces of the body portion 36.

Mounted in the pockets 40 of the pair of hangers 14, are carriers for the bearings of a line shaft 43, and each of said carriers consists of a block comprising a body portion 44, having its top and bottom formed with a pair of grooves 45, and said body portion 44 is furthermore provided with upwardly extending and downwardly disposed flanges 46. The grooves 45 extend lengthwise of the body portion 44, and are arranged in proximity to the sides thereof, and the flanges 46 are arranged to overlap the sides of the body portion 36 when the body portion 44 is mounted in the pocket 40. The body portion 44 is bifurcated, as at 47, and which aligns with the bifurcated portion 37 of the body portion 36. The body portion 44 is formed with an opening 48, near its outer end, and the inner end of the body portion 44 is formed with a semi-circular seat 45', which is arranged opposite the seat 41 and is oppositely disposed with respect thereto.

The carriers further include a pair of yoke-shaped elements 49, which have the legs thereof seated in the grooves 45, and with the legs of said elements 49 extended from the body portion 44. The inner end of each of the elements 49 is curved, as indicated at 50, and when the carrier is in normal position, the curved portions 50 seat in the grooves 42. The projecting ends of the legs of the elements 49 are threaded, as at 51, and mounted on the projecting ends of the legs of each element 49 is a connecting plate 52, and bearing against the latter are clamping nuts 53, which have threaded engagement with the legs of the elements 49. The elements 49 provide means, in a manner to be presently referred to, for connecting the carrier with the bearings of the line shaft 43, so that when the carrier is shifted the line shaft will be carried therewith. Mounted in each hanger 14, is a sectional bearing sleeve for the line shaft 43 and one of the sections of the sleeve is indicated at 54, and the other section at 55. Each section of a bearing sleeve has each end thereof provided with a flange 56. The section 54 is mounted against the seat 41, and the section 55 positioned against the seat 45'. When the sections 54 and 55 of the bearing sleeve are mounted in a hanger 14, the flanges 56 of said sections bear against the sides of the body portions 36 and 44.

When the bearing sleeves and carriers are set up, the elements 49 of each carrier extend around a bearing sleeve inwardly with respect to the flanges 56 thereof, and by this arrangement the carrier is connected with the line shaft 43, so that when the carrier is shifted the line shaft will be carried therewith.

The carriers which are mounted in the pair of hangers 14, of a truck, are simultaneously shifted and the mechanism for simultaneously shifting the carriers, includes the pair of sleeves 31, as well as the crank arms 32 and 33 of the said sleeves 31, and further includes a pair of shifting levers 57, each of which is pivotally mounted at its lower end on a pin 58, secured in the body portion 36, at the lower end thereof, and which intersects the bifurcated portion 37. Each of the levers 57, is furthermore connected to a pin 59, which is mounted in the opening 48 of the body portion 44. Each lever 57 is arranged in the bifurcated portion 37 of the body portion 36, and in the bifurcated portion 47 of the body portion 44. As each lever 57 is pivoted at 58, when the lever 57 is shifted it will carry the body portion 44 therewith, due to the connection with the lever 57 to the body portion 44, through the medium of the pin 59.

The upper end of each lever 57 has a crank arm 33 connected therewith, as at 60, and by this arrangement when the sleeves 31 are actuated, the crank arms 33 will shift the levers 57. The sleeves 31 are actuated through the means of a fluid pressure operated mechanism, and which consists of a cylinder 60, provided with a pair of pistons 61, 62, and to the former of which is attached a piston rod 63, and to the latter is secured a piston rod 64. The piston rod 63 is pivotally connected, as at 65, to one of the crank arms 32, and the piston rod 64 is pivotally connected, as at 66, to the other crank arm 32. The piston rods 63, 64, project from the ends of the cylinder 60. The cylinder 60 is provided centrally with a combined supply and exhaust pipe 67, which is common to the pistons 61, 62. At one end of the cylinder 60, a combined supply and exhaust pipe 68 is provided and which associates with the piston 61. At the other end of the cylinder 60 a combined supply and exhaust pipe 69 is provided and which associates with the piston 62.

A controlling valve device forms a part of the fluid pressure operated mechanism, and said device consists of a valve casing 70, having an inlet 71 leading from a source of supply, air or steam, and the casing 70 is furthermore provided with an exhaust 72. Communicating with the casing 70 is a combined supply and exhaust pipe 73, which leads to the cylinders 60, and communicating with the casing 70 is a combined supply and exhaust pipe 74 which also leads to the cylinders 60. Arranged within the casing 70 is a valve 75 for the purpose of controlling the pipes 73 and 74.

Figure 4 of the drawings illustrates the engine set up with a pair of trucks, and the fluid pressure operated mechanism is common to the shifting mechanism for the line shafts, and with reference to Figure 4 the line shafts are indicated at 76 and 77, the former is provided with a pair of pinions 78 and the latter with a pair of pinions 79. The pinions 78 are oppositely disposed with respect to the pinions 79. The line shaft 76, as well as the line shaft 77, includes an expansion sleeve 80, which is interposed in the shaft and further includes a universal socket 81, which is interposed in the shaft between the expansion sleeve and the inner end thereof. The line shaft 76, is independent of the line shaft 77, and the inner ends of the said shafts 76 and 77 are mounted in a bearing 82, carried by a hanger 83. In proximity to the inner end of the shaft 76, as well as the shaft 77, each of said shafts is provided with a pinion, and the pinions carried by the shaft 76 are indicated at 84, and the pinion carried by the shaft 77 is indicated at 85. The pinions 84, 85, are oppositely disposed with respect to each other and are engaged and operated by a transmission 86, which is driven from the engine.

Associated with the line shaft 76, is a cylinder 60, and associated with the line shaft 77 is a cylinder 60. The combined supply and exhaust ports 67, of the cylinders 60, are connected together by a pipe 87 common thereto and into which opens the pipe 73. Common to the combined supply and exhaust ports 68, 69, of the cylinders 60, is a pipe 88, into which opens the pipe 74.

By connecting up the ports 67, 68, and 69 of one cylinder 60 with the ports 67, 68 and 69 of the other cylinder 60, it is obvious that when the valve 75 is shifted, that the pistons 61 and 62 of the cylinders 60 will be actuated simultaneously, causing thereby the shifting of the levers 57, shifting the carriers therewith, to move the pinions 78 and 79 into and out of mesh with the crown gears 19. When the valve 75 is shifted to the position shown in Figure 5, the exhaust will be had through the port 67 from the cylinder 60, and supply of pressure will be had to the cylinder 60 through the ports 68, 69, and if the valve 75 is shifted to the position shown in dotted lines, Figure 5, then supply of pressure would be had to the cylinder 60 through the port 67, and exhaust would be had through the ports 68, 69, from the cylinder 60.

Each of the levers 57 is provided with an opening 89, adapted to register with an opening 90 formed in the body portion 36 for the reception of a pin 91 connected with the truck by a flexible member 92. When the pin 91 is mounted in the registering openings 89 and 90, shifting of the lever 57 is prevented, and the carrier is maintained in its innermost position in the hanger 14, whereby the pinions of the line shaft are retained in mesh with the crown gears of the wheels. The pin 91 is employed for holding the lever in its outward position when shifted, as indicated in dotted lines, Figure 8, whereby the pinions on the line shaft are held in position clear of the crown gears on the wheels, and when the lever 57 is maintained in such position, the pin 91 extends through the opening 90 and against the inner side edge of the lever 57.

From the foregoing construction of gear shifting mechanism, a means is provided whereby the line shafts and their pinions can be shifted out of mesh with the crown gears of the wheels of the truck so as to discontinue the travel of the engine without discontinuing the operation of the transmission drive for the line shafts, and the mechanism is so set up that the driving pinions cooperating with the crown gears can be shifted into mesh therewith, or moved out of mesh therefrom, and although the preferred embodiment of the invention is as shown and described, yet it is to be understood that changes in the details of construction can be had which will fall within the light of the invention as claimed.

What we claim is:—

1. In a gear shifting mechanism for Shay engines, the combination with a hanger element adapted to be supported from a wheel truck and provided at its inner side with an axle supporting means and further provided with an outwardly opening pocket, of a line shaft extending through said hanger, a truck wheel propelling means carried by said shaft at one side of the hanger, a shiftable carrier slidably mounted in said pocket, a bearing for the line shaft at the inner end of the carrier, means for connecting the bearing to the line shaft whereby the latter is coupled to the carrier, and a shiftable lever pivotally connected to said element and further connected to the carrier for shifting the latter carrying the line shaft therewith to move said propelling means out of propelling position with respect to the truck wheel.

2. In a gear shifting mechanism for Shay engines, the combination with a hanger element adapted to be supported from a wheel truck and provided at its inner side with an axle supporting means and further provided with an outwardly opening pocket, of a line shaft extending through said hanger, a truck wheel propelling means carried by said shaft at one side of the hanger, a shiftable carrier slidably mounted in said pocket, a bearing for the line shaft at the inner end of the carrier, means for connecting the bearing to the line shaft whereby the latter is coupled to the carrier, a shiftable lever pivotally connected to said element and further connected to the carrier for shifting the latter carrying the line shaft therewith to move said propelling means out of propelling position with respect to the truck wheel, and a fluid pressure operating means connected to the upper end of the lever for shifting it.

3. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, and means for connecting the bearing to the carrier whereby the bearing will be shifted simultaneously on the shifting movement of the carrier.

4. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, means for connecting the bearing to the carrier whereby the bearing will be shifted simultaneously on the shifting movement of the carrier, and a carrier shifting lever pivoted to the hanger and connected to the carrier.

5. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, means for connecting the bearing to the carrier whereby the bearing will be shifted simultaneously on the shifting movement of the carrier, and a carrier shifting lever pivoted to the lower end of the hanger and extending up through and connected to the carrier.

6. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, means for connecting the bearing to the carrier whereby the bearing will be shifted simultaneously on the shifting movement of the carrier, a carrier shifting lever pivoted to the hanger and connected to the carrier, and means connected to the upper end of the lever for shifting it.

7. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, means for connecting the bearing to the carrier whereby the bearing will be shifted simultaneously on the shifting movement of the carrier, a carrier shifting lever pivoted to the lower end of the hanger and extending up through and connected to the carrier, and means connected to the upper end of the lever for shifting it.

8. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, means for connecting the bearing to the carrier whereby the bearing will be shifted simultaneously on the shifting movement of the carrier, a carrier shifting lever pivoted to the hanger and connected to the carrier, and a fluid pressure operated lever mechanism for shifting said lever.

9. In a gear shifting mechanism for Shay engines, a shiftable line shaft support comprising a hanger adapted to be supported from a wheel truck and provided with a pocket opening at its outer side and through which is adapted to extend the line shaft, a shiftable carrier mounted in said pocket, a line shaft bearing extending transversely of the pocket, means for connecting the bearing to the carrier whereby the bearing will be shifted simultaneously on the shifting movement of the carrier, a carrier shifting lever pivoted to the lower end of the hanger and extending up through and connected to the carrier, and a fluid pressure operated lever mechanism for shifting said lever.

In testimony whereof, we affix our signatures hereto.

WILLIAM P. LEFTWICH.
DIRA S. STOUT.